(12) United States Patent
Hall et al.

(10) Patent No.: US 10,643,601 B2
(45) Date of Patent: May 5, 2020

(54) DETECTION MECHANISM FOR AUTOMATED DIALOG SYSTEMS

(71) Applicant: Semantic Machines, Inc., Newton, MA (US)

(72) Inventors: David Leo Wright Hall, Berkeley, CA (US); Daniel Klein, Orinda, CA (US)

(73) Assignee: Semantic Machines, Inc., Newton, MA (US)

( * ) Notice: Subject to any disclaimer, the term of this patent is extended or adjusted under 35 U.S.C. 154(b) by 145 days.

(21) Appl. No.: 15/885,790

(22) Filed: Jan. 31, 2018

(65) Prior Publication Data

US 2018/0226068 A1 Aug. 9, 2018

Related U.S. Application Data

(60) Provisional application No. 62/456,870, filed on Feb. 9, 2017.

(51) Int. Cl.

| | | |
|---|---|---|
| *G06F 17/27* | (2006.01) | |
| *G10L 15/06* | (2013.01) | |
| *G10L 15/18* | (2013.01) | |
| *G06F 17/24* | (2006.01) | |
| *G10L 15/22* | (2006.01) | |

(52) U.S. Cl.
CPC .......... *G10L 15/063* (2013.01); *G06F 17/241* (2013.01); *G06F 17/2705* (2013.01); *G10L 15/1815* (2013.01); *G10L 15/1822* (2013.01); *G10L 15/22* (2013.01)

(58) Field of Classification Search
CPC .................................................. G06F 17/2705
USPC .......................................................... 704/243
See application file for complete search history.

(56) References Cited

U.S. PATENT DOCUMENTS

| | | | |
|---|---|---|---|
| 5,956,668 | A | 9/1999 | Alshawi et al. |
| 10,134,389 | B2 * | 11/2018 | Hakkani-Tur ........ G10L 15/063 |
| 10,276,160 | B2 * | 4/2019 | Andreas ................ G06F 17/241 |
| 10,319,381 | B2 * | 6/2019 | Andreas ................ G06F 17/241 |
| 2002/0052742 | A1 | 5/2002 | Thrasher et al. |
| 2004/0167779 | A1 | 8/2004 | Lucke et al. |
| 2007/0067174 | A1 | 3/2007 | Verma et al. |
| 2007/0265850 | A1 | 11/2007 | Kennewick et al. |
| 2011/0166851 | A1 | 7/2011 | Lebeau et al. |
| 2017/0092259 | A1 | 3/2017 | Jeon et al. |

OTHER PUBLICATIONS

PCT Application No. PCT/US2018/017641 International Search Report and Written Opinion dated May 7, 2018.

* cited by examiner

*Primary Examiner* — Susan I McFadden
(74) *Attorney, Agent, or Firm* — Alleman Hall Creasman & Tuttle LLP

(57) ABSTRACT

A conversational system receives an utterance, and a parser performs a parsing operation on the utterance, resulting in some words being parsed and some words not being parsed. For the words that are not parsed, words or phrases determined to be unimportant are ignored. The resulting unparsed words are processed to determine the likelihood they are important and whether they should be addressed by the automated assistant. For example, if a score associated with an important unparsed word achieves a particular threshold, then a course of action to take for the utterance may include providing a message that the portion of the utterance associated with the important unparsed word cannot be handled.

14 Claims, 11 Drawing Sheets

- A: Hello! How can I help you?
- U: I want to fly to Boston on the next Tuesday
- A: Ok, to Boston (BOS) leaving Tue, December 13.
- A: Where would you like to leave from?
- U: San Francisco
- A: Ok, from San Francisco (SFO).
- A: When would you like to return?
- U: Friday Friday after that
- A: Ok, coming back Fri, December 16.
- A: Do you have any other preferences for your flight?
- U: I want to get travel insurance
- A: I didn't understand that. Please try again.

FIGURE 7

- A: Hello! How can I help you?
- U: I want to fly to Boston on the next Tuesday
- A: Ok, to Boston (BOS) leaving Tue, December 13.
- A: Where would you like to leave from?
- U: San Francisco
- A: Ok, from San Francisco (SFO).
- A: When would you like to return?
- U: Friday Friday after that
- A: Ok, coming back Fri, December 16.
- A: Do you have any other preferences for your flight?
- U: I want to get travel insurance
  - System analysis happens
  - A. System parses sentence
  - B. ("want to get") is marked as parent
  - C. "TRAVEL INSURANCE" is looked up in Wikipedia
  - D. Wikipedia entry is analyzed to understand that "travel insurance" is some type of financial instrument
  - E. System finds travel insurance is offered by airline
  - F. System asks an appropriate question
- Travel insurance is offered by your airline. Shall I add it to the ticket?

FIGURE 8

- A: Hello! How can I help you?
- U: I want to fly to Boston on the next Tuesday
- A: Ok, so Boston (BOS) leaving Tue, December 11.
- A: Where would you like to leave from?
- U: San Francisco
- A: Ok, from San Francisco (SFO).
- A: When would you like to return?
- U: Friday Friday after that
- A: Ok, coming back Fri, December 18.
- A: Do you have any other preferences for your flight?
- U: I have to be there for an interview, so I need to leave in the morning
  - System analysis happens
  - A: System parses sentence
  - B: "I need to leave in the morning" is marked as parsed
  - C: "I have to be there for an interview" is marked as not parsed
  - D: System action "search for flights leaving in the morning" is confirmed
  - D: "I need to leave in the morning" is ignored
- A: Searching for morning flights.

FIGURE 9

- A: Hello! How can I help you?
- U: I want to fly to Boston on the next Tuesday
- A: Ok, to Boston (BOS) leaving Tue, December 13.
- A: Where would you like to leave from?
- U: San Francisco
- A: Ok, from San Francisco (SFO).
- A: When would you like to return?
- U: Friday Friday after that
- A: Ok, coming back Fri, December 16.
- U: I want to book tickets to the aquarium.
  - [System analysis:
  - "I want to book tickets" parsed – understood as action with a unified argument
  - "aquarium" – not in semantic dictionary, syntactic parse suggests it is a place
- A: I'm sorry, but I do not know how to book tickets to an aquarium.

FIGURE 10

DETECTION MECHANISM FOR AUTOMATED DIALOG SYSTEMS

CROSS REFERENCE TO RELATED APPLICATIONS

The present application claims the priority benefit of U.S. provisional patent application no. 62/456,870, filed on Feb. 9, 2017, titled "Detection Mechanism for Automated Dialogue Systems," the disclosure of which is incorporated herein.

BACKGROUND

An Automated Assistant is software which is designed to converse with a user about one or several domains of knowledge. Previous technology, like SIRI or Alexa, the command/control systems from Apple Computer and Amazon respectively, often fail to provide the system or answer which the user was looking for. This is due at least in part because to dialogue systems handling a narrow domain. This problem becomes even more severe in a conversational system, which must understand context in the dialog, as well as information from one or many sources. Current systems such as the "semantic web", which attempts to provide semantic annotation to web pages (a simpler task than conversational transactions) have failed to satisfy the requirements of users: "Some of the challenges for the Semantic Web include vastness, vagueness, uncertainty, inconsistency, and deceit. Automated reasoning systems will have to deal with all of these issues to deliver on the promise of the Semantic Web."

Semantic analysis techniques of past systems appear to depend on bag-of-words classifiers trained on utterances of "in-domain" vs "out-of-domain" interactions. This two-way (or multi-way, for use in multi-domain systems) approach is defective in at least three ways. First, it ignores the dialog state of an interaction. Second, it does not allow re-analysis of the state of some phrase or word during the conversation. Third, it does not take into account whether the system needs to understand the phrases in the utterance. For at least these reasons, it's difficult to determine when subject matter of an utterance is out of the known domain for an automated assistant.

SUMMARY

The conversational system of the present technology provides a novel way to deal with the cases where the user provides information that the system is unable or incapable of understanding in the current context. In this new system, there is an automatic identification of words or phrases in the sentences or data to be delivered, provided by a large dictionary, a dialog model which interacts with the data, or a statistical model of the language and of the interactions in the system.

For any word or phrase, the system attempts to decide whether the words or phrases are likely to be important to the user, for example given the implied or assumed intent of the interaction. For instance, in the dialog snippet "I need to fly to Boston for a job interview", the fact that the trip is for a job interview will not affect the interpretation of the sentence as a request for flights to Boston. On the other hand, in the sentence "I need help with a job interview", the fact that the conversation is critically about a job interview requires semantic interpretation of the act of preparing for a job interview.

The intention conditioned semantic interpretations in human/machine interactions are separable from the semantic interpretations of the same words in other environments, as demonstrated in the paragraph above. In particular, the present system can be trained for various topics, and does not have to be retrained as topics are added or deleted from the system capabilities.

At a high level, and utterance is received by an automated assistant. A parser performs a parsing operation on the utterance, resulting in some words being parsed and some words not being parsed. For the words that are not parsed, words or phrases determined to be unimportant are ignored. The resulting unparsed words are processed to determine the likelihood they are important and whether they should be addressed by the automated assistant. For example, if a score associated with an important unparsed word achieves a particular threshold, then a course of action to take for the utterance may include providing a message that the portion of the utterance associated with the important unparsed word cannot be handled.

In embodiments, a method provides a conversational system that detects important out-of-domain content. The method includes receiving an utterance having multiple words. A parsing operation is performed on the utterance by parser code stored in memory and executed by a processor on a computing device. One or more words of the utterance are determined to not be recognized by the parser. One or more of the one or more words are determined to not be recognized by the parser are important by classifier code stored in memory and executed by a processor on the computing device. An action can be generated based on the words that are parsed by the parser and the important words that are not parsed by the parser.

BRIEF DESCRIPTION OF FIGURES

FIG. 7 is a diagram of an exchange between a user and an automated assistant.

FIG. 8 is a diagram of an exchange between a user and an automated assistant, augmented by analysis of unrecognized words.

FIG. 9 is a diagram of an exchange between a user and an automated assistant with unparsed words in an utterance being ignored.

FIG. 10 is a diagram of an exchange between a user and an automated assistant with a message that the assistant can't act upon a particular word(s).

DETAILED DESCRIPTION

The conversational system (i.e., automated assistant) of the present technology, roughly described, handles cases where the user provides information that the system is unable or incapable of understanding in the current context. In this system, there is an automatic identification of words or phrases in the sentences or data to be delivered, provided by a large dictionary, a dialog model which interacts with the data, or a statistical model of the language and of the interactions in the system.

For any word or phrase, the system attempts to decide whether or not the words or phrases are likely to be important to the user, for example given the implied or assumed intent of the interaction. For instance, in the dialog snippet "I need to fly to Boston for a job interview", the fact that the trip is for a job interview will not affect the interpretation of the sentence as a request for flights to Boston. On the other hand, in the sentence "I need help with a job interview", the fact that the conversation is critically about a job interview requires semantic interpretation of the act of preparing for a job interview.

The intention conditioned semantic interpretations in human/machine interactions are separable from the semantic interpretations of the same words in other environments. The present system can be trained for various topics and does not have to be retrained as topics are added or deleted from the system capabilities.

In some instances, an automated assistant receives an utterance. A parser performs a parsing operation on the utterance, resulting in some words being parsed and some words not being parsed. For the unparsed words, words or phrases determined to be unimportant are ignored. The remaining unparsed words are processed to determine the likelihood they are important and whether they should be addressed by the automated assistant. For example, if a score associated with an important unparsed word achieves a particular threshold, then a course of action to take for the utterance may include providing a message that the portion of the utterance associated with the important unparsed word cannot be handled.

Figure 1:
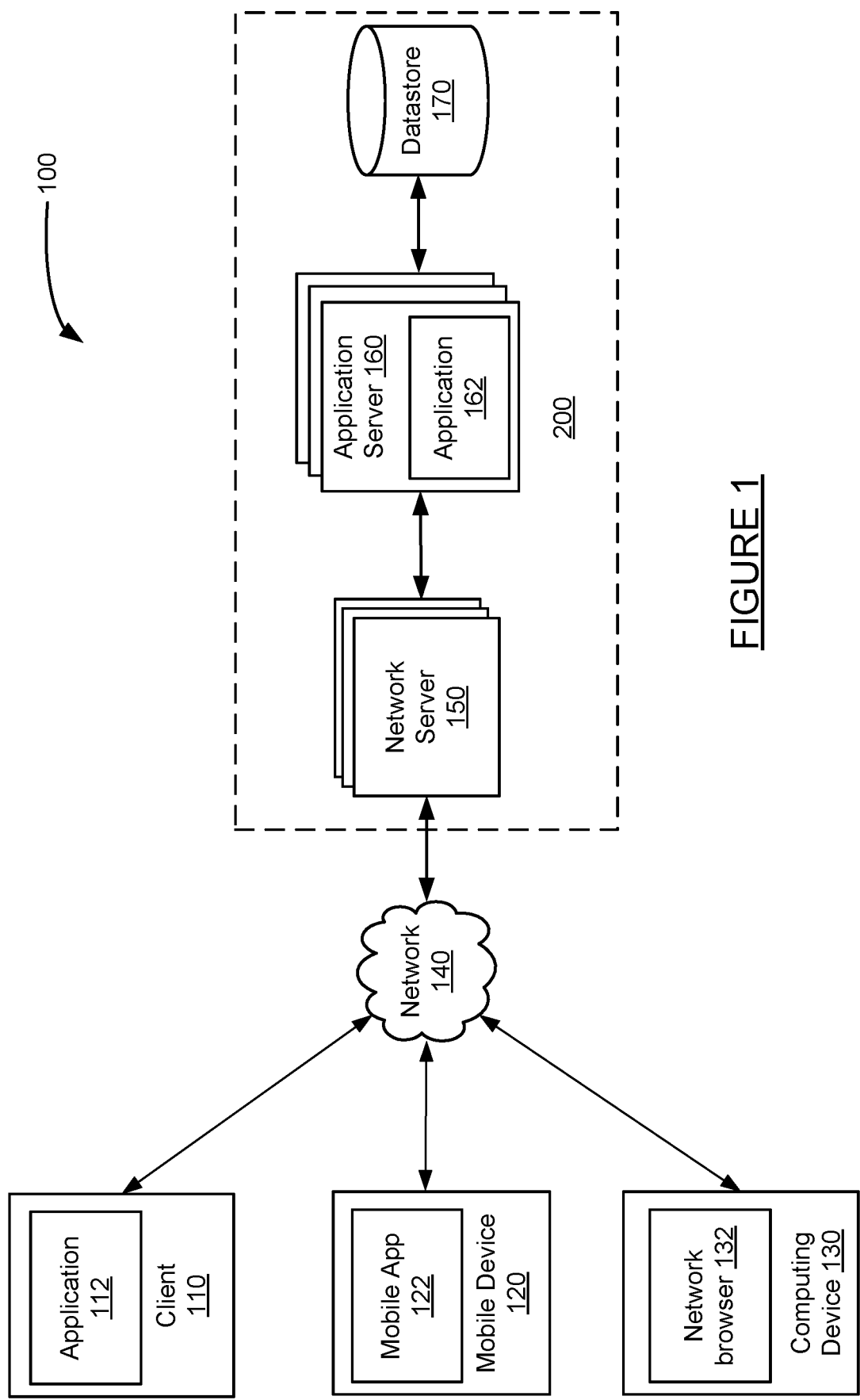
FIG. 1 is a block diagram of a system for providing an automated assistant that can detect out-of-domain subject matter.

FIG. 1 is a block diagram of a system for providing an automated assistant that can detect out-of-domain subject matter. System 100 of FIG. 1 includes client 110, mobile device 120, computing device 130, network 140, network server 150, application server 160, and data store 170. Client 110, mobile device 120, and computing device 130 communicate with network server 150 over network 140. Network 140 may include a private network, public network, the Internet, and intranet, a WAN, a LAN, a cellular network, or some other network suitable for the transmission of data between computing devices of FIG. 1.

Client 110 includes application 112. Application 112 may provide an automated assistant, TTS functionality, automatic speech recognition, parsing, domain detection, and other functionality discussed herein. Application 112 may be implemented as one or more applications, objects, modules, or other software. Application 112 may communicate with application server 160 and data store 170 through the server architecture of FIG. 1 or directly (not illustrated in FIG. 1) to access data.

Mobile device 120 may include a mobile application 122. The mobile application may provide the same functionality described with respect to application 112. Mobile application 122 may be implemented as one or more applications, objects, modules, or other software, and may operate to provide services in conjunction with application server 160.

Computing device 130 may include a network browser 132. The network browser may receive one or more content pages, script code and other code that when loaded into the network browser the same functionality described with respect to application 112. The content pages may operate to provide services in conjunction with application server 160.

Network server 150 may receive requests and data from application 112, mobile application 122, and network browser 132 via network 140. The request may be initiated by the particular applications or browser applications. Network server 150 may process the request and data, transmit a response, or transmit the request and data or other content to application server 160.

Application server 160 includes application 162. The application server may receive data, including data requests received from applications 112 and 122 and browser 132, process the data, and transmit a response to network server 150. In some implementations, the network server 152 forwards responses to the computer or application that originally sent the request. Application's server 160 may also communicate with data store 170. For example, data can be accessed from data store 170 to be used by an application to provide the functionality described with respect to application 112. Application server 160 includes application 162, which may operate similar to application 112 except implemented all or in part on application server 160.

Block 200 includes network server 150, application server 160, and data store 170, and may be used to implement an automated assistant that includes a domain detection mechanism. Block 200 is discussed in more detail with respect to FIG. 2.

Figure 2:
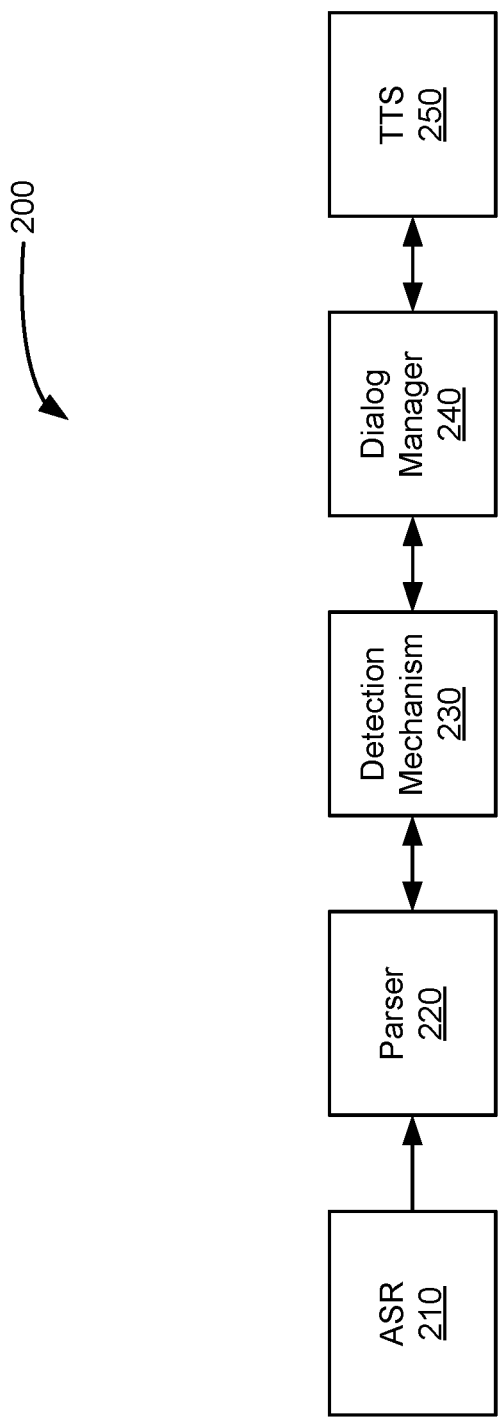
FIG. 2 is a block diagram of modules that implement an automated assistant application.

FIG. 2 is a block diagram of modules within automated assistant application. The modules comprising the automated assistant application may implement all or a portion of application 112 of client 110, mobile application 122 of mobile device 120, and/or application 162 and server 160 in the system of FIG. 1.

The automated assistant application of FIG. 2 includes automatic speech recognition module 210, parser module 220, detection mechanism module 230, dialog manager module 240, and text to speech module 250. Automatic speech recognition module 210 receives an audio content, such as content received through a microphone from one of client 110, mobile device 120, or computing device 130, and may process the audio content to identify speech. The ASR module can output the recognized speech as a text utterance to parser 220.

Parser 220 receives the speech utterance, which includes one or more words, and can interpret a user utterance into intentions. Parser 220 may generate one or more plans, for example by creating one or more cards, using a current dialogue state received from elsewhere in the automated assistant. For example, parser 220, as a result of performing a parsing operation on the utterance, may generate one or more plans that may include performing one or more actions or tasks. In some instances, a plan may include generating one or more cards within a system. In another example, the action plan may include generating number of steps by system such as that described in US patent application No. 62/462,736, filed Feb. 23, 2017, entitled "Expandable Dialogue System," the disclosure of which is incorporated herein in its entirety.

In the conversational system of the present technology, a semantic parser is used to create information for the dialog manager. This semantic parser uses information about past usage as a primary source of information, combining the past use information with system actions and outputs, allowing each collection of words to be described by its contribution to the system actions. This results in creating a semantic description of the word/phrases The parser may also generate a coverage vector for the utterance. A coverage vector may indicate which portions of an utterance were parsed by the parser module. A coverage vector may be a simple binary indication as to whether each word in an utterance was parsed. For example, for the utterance "I want to fly to Boston for a job interview," a parser might only be able to parse the phrase "fly to Boston." As a result, the phrases "I want to" and "for a job interview" would not be parsed, resulting in a coverage vector as shown below for the utterance:

"I want to fly to Boston for a job interview"
0 0 0 1 1 1 0 0 0 0

The parser used in the present system should be capable of reporting words used in any utterance, and also should report used which could have been used (an analysis is available) but which were not used because they did not satisfy a threshold. In addition, an accounting of words not used will be helpful in later analysis of the interchanges by the machine learning system, where some of them may be converted to words or phrases in that particular context which have an assigned semantic label.

Detection mechanism 230 can receive the plan and coverage vector generated by parser 220, detect unparsed words that are likely to be important in the utterance, and modify the plan based on important unparsed words. Detection mechanism 230 may include a classifier that classifies each unparsed word as important or not based on one or more features. For each important word, a determination is made as to whether a score for the important word achieves a threshold. In some instances, any word or phrase candidate which is not already parsed by the system is analyzed by reference to its past statistical occurrences, and the system then decides whether or not to pay attention to the phrases. If the score for the important unparsed word reaches the threshold, the modified plan may include generating a message that the important unparsed word or some action associated with the unparsed word cannot be handled or performed by the administrative assistant.

In some instances, the present technology can identify the single phrase maximizing a "phraseScore" function, or run a Semi-Markov dynamic program to search for the maximum assignment of phrases to the phraseScore function. If used, the Dynamic program will satisfy the following recurrence $$\text{score}[j]=\max(\text{score}[j-1],\max\_\{i<j\}(\text{score}(i)+\text{phraseScore}(i,j)*\text{all}(\text{eligible}[i:j])))$$

Figure 3:
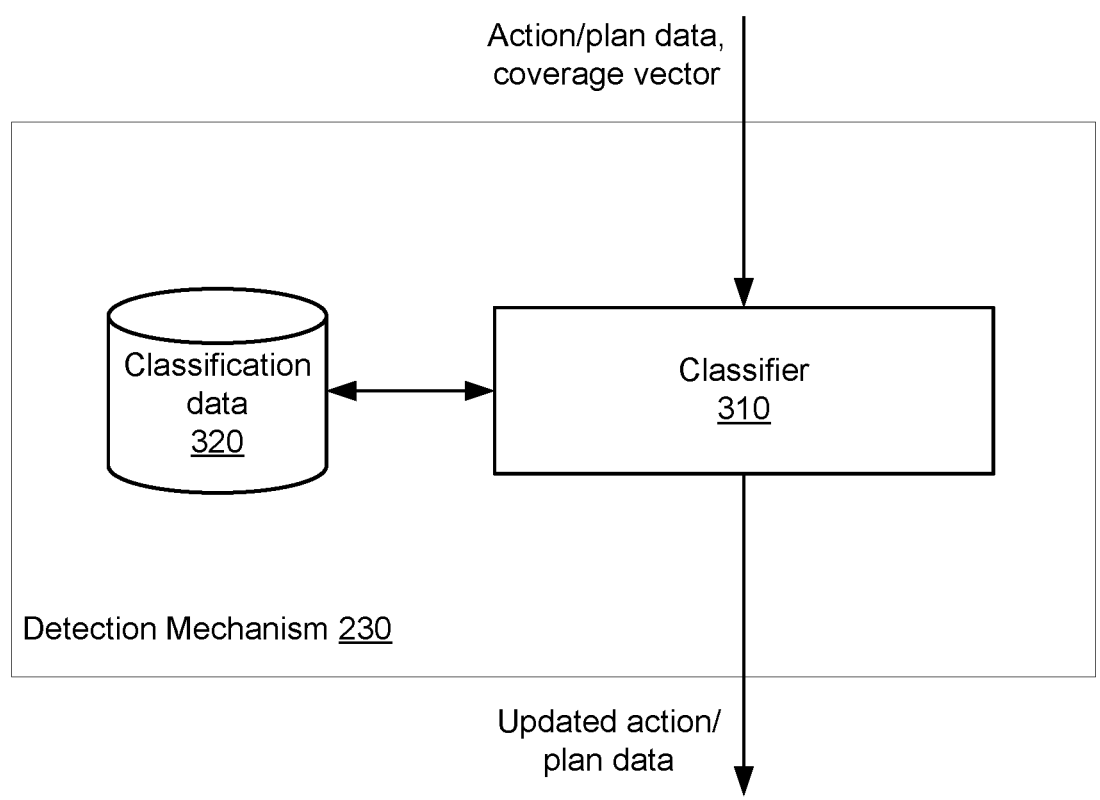
FIG. 3 is a block diagram of a detection mechanism module.

The phrase can be returned with the highest score that exceeds some threshold (set for desired sensitivity). In some instances, a phraseScore is any computable function of the dialog state and the input utterance. In some instances, the phraseScore is a machine learnable function, estimated with a Neural Network or other statistical model, having the following features:

Detection mechanism 230 is discussed in more detail with respect to the block diagram of FIG. 3.

Dialog manager 240 may perform actions based on a plan and context received from detection mechanism 230 and/or parser 220 and generate a response based on the actions performed and any responses received, for example from external services and entities. The dialog manager's generated response may be output to text-to-speech module 250. Text-to-speech module 250 may receive the response, generate speech the received response, and output the speech to a device associated with a user.

Additional details for an automated assistant application such as that of FIG. 2 are described in additional detail in U.S. patent application Ser. No. 15/792,236, filed Oct. 24, 2017, entitled "Sequence to Sequence Transformations for Speech Synthesis Via Recurrent Neural Networks," the disclosure of which is incorporated herein in its entirety.

FIG. 3 is a block diagram of a detection mechanism. FIG. 3 provides more detail for detection mechanism 230 of FIG. 2. Detection mechanism 230 includes classifier 310 and classification data 320. Classifier 310 may receive an original plan from parser 220 as well as a coverage vector. Classifier 310 may then classify each unparsed word as likely to be important or unimportant. In some instances, the classifier may first identify unimportant words based on a number of characteristics. The unimportant words may then be ignored.

For each remaining unparsed word, a likelihood of being important is generated, for example as a score. If the score reaches a threshold, the classifier may modify the original plan provided by the parser to include an action for providing information to a user that the word or an action associated with the word that was not parsed cannot be performed by the automated assistant.

Classification data in datastore 320 may include data, libraries, records, and other information for helping classifier 310 classify unparsed words. The classification data may include, for example, entity names, semantic rules, and other content use identify important words within an utterance.

Figure 4:
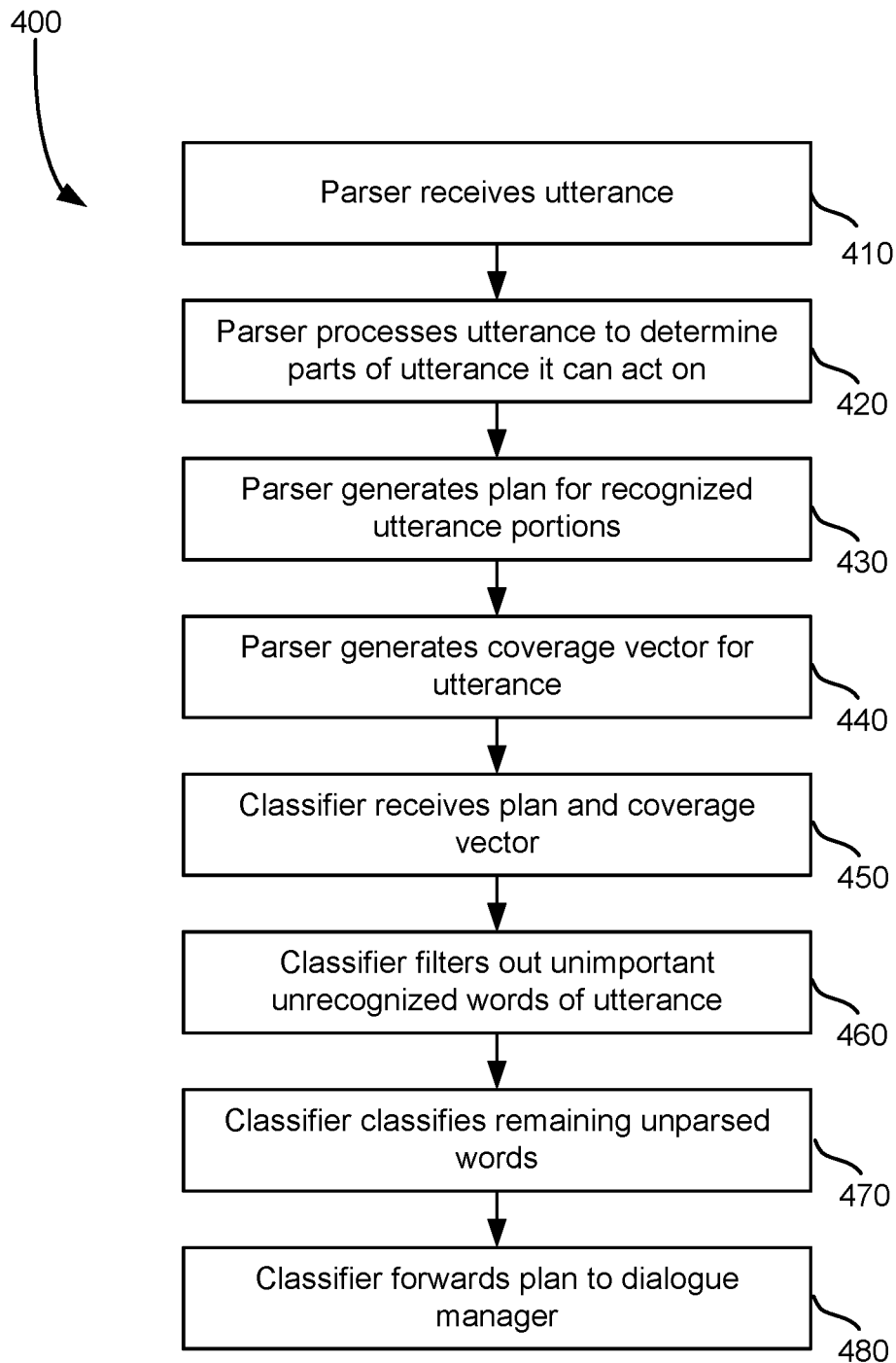
FIG. 4 is a method for detecting out-of-domain content by an automated assistant.

FIG. 4 is a method for detecting out-of-domain content by an automated assistant. The method of FIG. 4 begins with a parser receiving an utterance at step 410. The utterance may be received from an automatic speech recognition module or from some other source. The parser may then process the utterance to determine parts of the utterance that it can act on at step 420. The parser may act on words that it recognizes and may determine that some words are unrecognized (i.e., out-of-domain) and therefore are not parsed.

The parser generates a plan for the portions of the utterance that are recognized at step 430. The plan may include a context, one or more actions or steps to perform, and other information. For example, an action might be in the form of a card or step that causes a flight time to be retrieved from a third-party service, to make a restaurant reservation through a website, or perform some other action.

The parser 210 generates a coverage vector for the utterance at step 440. The coverage vector indicates whether each word is parsed by the parser or not. In some instances, the coverage vector may include a binary value for each word in the utterance. Generating a coverage vector is described in more detail with respect to the method of FIG. 5.

A classifier receives a plan and coverage vector from the parser at step 450. The classifier may then filter out unimportant out-of-domain (i.e., unparsed) words from the utterance at step 460. The classifier may identify unimportant unparsed words using any of several methods, including identifying non-noun phrases, prepositions, and other portions of an utterance based on semantic rules and other guidelines.

The system of the present technology is quite effective in ignoring information which is provided by the user but is not critical to carrying out the interchange between the user and the system in some particular domain. Humans often insert irrelevant information into their conversations, and the ability to ignore non-essential information adds substantially to the smooth functioning of an automated assistant.

A classifier then classifies the remaining unparsed words at step 470. The remaining unparsed words can be analyzed to determine a likelihood to be important. Based on whether any of the likelihood values or scores exceed a threshold, the classifier may determine if a change in a plan of action is necessary. Classifying unparsed words is discussed in more detail with respect to the method of FIG. 6.

Classifier forwards a plan to a dialog manager at step 480. The plan may be the original plan of action generated by a parser if no unparsed words are sufficiently important, or may be modified based on one or more actions generated as a result of the unparsed important words.

In some instances, the domain of the automated assistant may be expanded by adding a module of additional words, such as for example for airline reservations. The domain expansion does not require any additional training of the classifier or any other module, and does not require large amounts of data.

Figure 5:
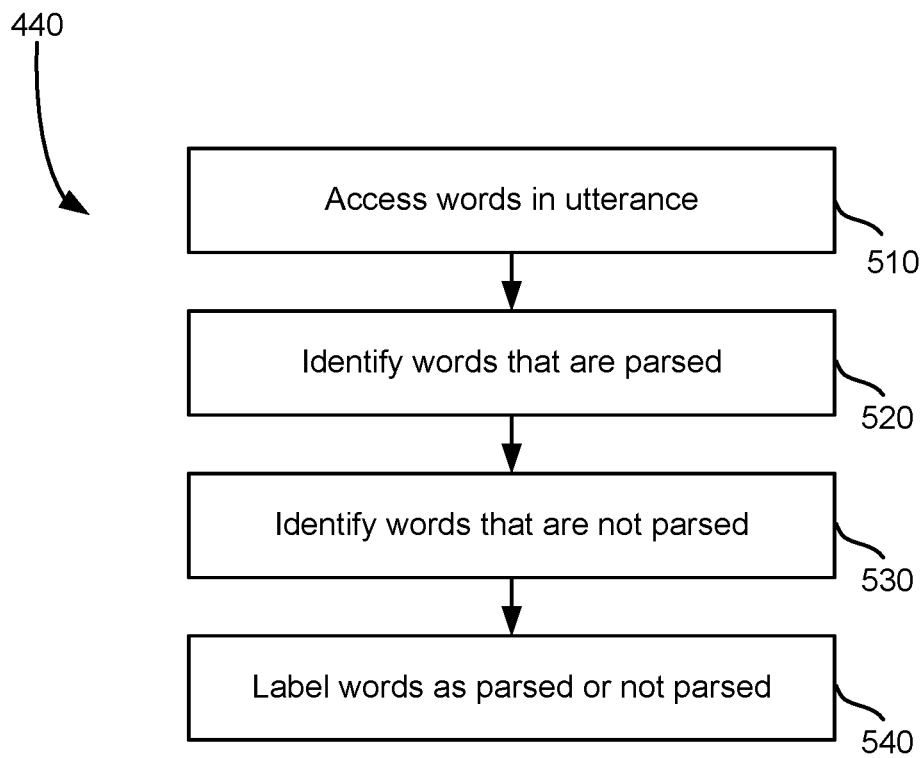
FIG. 5 is a method for generating a coverage vector for an utterance by a parser.

FIG. 5 is a method for generating a coverage vector for utterance by a parser. The method of FIG. 5 provides more detail for step 440 the method of FIG. 4. Words in an utterance are accessed at step 510. The words of the utterance that are parsed are identified at step 520. Words of the utterance that are not parsed are identified at step 530, and each word in the utterance is then labeled as parsed or not parsed at step 540.

Figure 6:
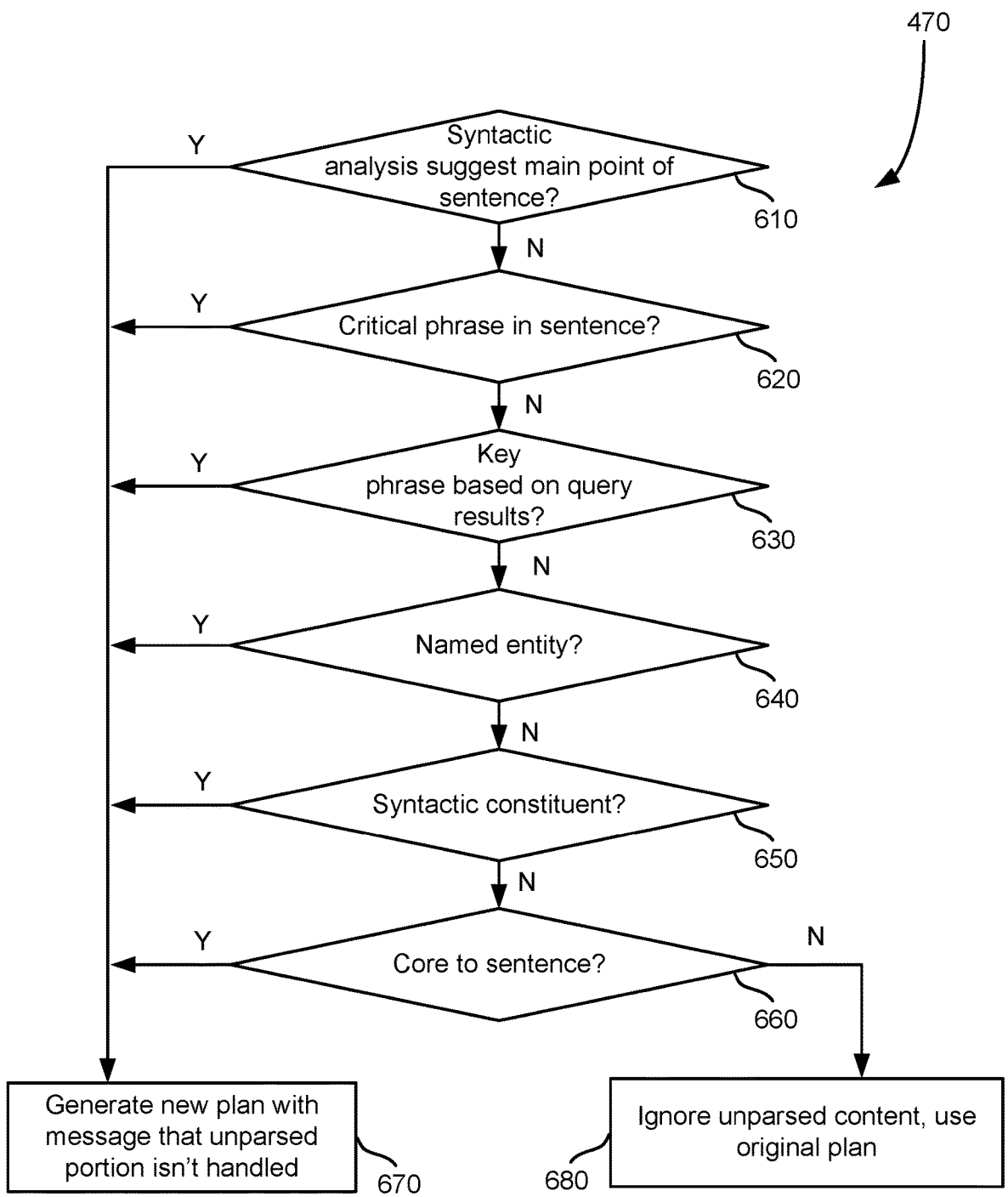
FIG. 6 is a method for classifying unparsed words by a classifier.

FIG. 6 is a method for classifying unparsed words by a classifier. The method of FIG. 6 provides more detail for step 470 of the method of FIG. 4. First, a determination is made as to whether a syntactic analysis suggests that one or more unparsed words are the main point of an utterance/sentence at step 610. If the analysis suggests that the words are the main point of a sentence, then a new plan of action is generated at step 670. The new plan of action may include a message that the unparsed portion isn't handled appropriately by the automated assistant.

If the analysis does not suggest that the unparsed words are the main point of sentence, a determination is made as to whether unparsed words include a critical phrase in the utterance at step 620. If any unparsed words are determined to include a critical phrase, a new plan is generated at 670. If the unparsed words are not determined to be a critical phrase, a determination is made as to whether the unparsed words are identified as a key phrase based on query results at step 630. In some instances, the unparsed words may be used to form a query over a network, such as the Internet. In some instances, different content pages on the Internet can be used to identify a key phrase. For example, a query may be made to a website, such as Wikipedia, to determine if links to the key phrase exist. If the key phrase is based on query results at step 630, the method continues to step 670.

If a key phrase is not based on query results, a determination is made as to whether the unparsed words form a named entity at step 640. If the unparsed words form a named entity, the words are likely important and the method of FIG. 6 continues to step 670.

If the words do not form a named entity, a determination is made as to whether the words form a syntactic constituent at step 650. If the unparsed words form a syntactic constituent, the method continues to step 670. If they do not form the constituent, a determination is made as to whether the words are core to the sentence at step 660. This determination may be made based on semantic models and other information. If the unparsed words are not core to the sentence, the new plan of action is generated at step 670. The words are not core to the sentence, then the method continues to step 680 wherein unparsed content is ignored and an original plan of action is used The present technology efficiently and accurately detects when an utterance includes content that is outside the domain handled by the administrative assistant. Unlike prior systems, the present technology detects the out-of-domain portion and indicates issues associated with the out-of-domain content to user when appropriate.

The words or phrases identified by the method described of FIG. 6 are now eligible for further analysis in the operating system, or alternatively they form the data for a machine learning algorithm which will assign a semantic identity to the phrase or word. The identity of phrases or words as items of interest is critical to the functioning of the Automated Assistant system, and the scoring above using a threshold has been very effective in identifying phrases and learning their semantic identity.

FIG. 7 is a diagram of an exchange between a user in an automated assistant typical of prior systems. In the exchange of FIG. 7, a user attempts to schedule a flight to Boston from San Francisco, and then desires to get travel insurance. The travel insurance utterance is out-of-domain for the administrative assistant. In response, the automated assistant indicates "I didn't understand that. Please try again." This vague statement that the agent did not understand that and to try again does not the user understand what was wrong or what should be done differently in subsequent taps.

FIG. 8 is a diagram of an exchange between the user and an automated assistant, augmented by analysis of unrecognized words. In the exchange of FIG. 8, conversation with an automated assistant is augmented by the system's ability to pick up and analyze unrecognized words or phrases. As shown, when a user indicates she wants to get travel insurance, the system parses a sentence, looks up and unparsed portion on a third-party network service, determines the unparsed portion is important, and modifies an original plan with an updated plan to address the unparsed portion.

FIG. 9 is a diagram of an exchange between a user and an automated assistant with unknown words in an utterance being ignored. In this example, the unparsed words are determined to not be sufficiently important and are ignored (and not addressed) in a response provided by the automated assistant.

FIG. 10 is a diagram of an exchange between a user and an automated assistant with a message that the assistant can't act upon a particular word(s). In the exchange of FIG. 10, the user utterance reads "I want to book tickets to the aquarium." The system parses the portion "I want to book tickets" and identifies "aquarium" as an unparsed important word. As a result, a modified plan generated that recites "I do not know how to book tickets to an aquarium".

Figure 11:
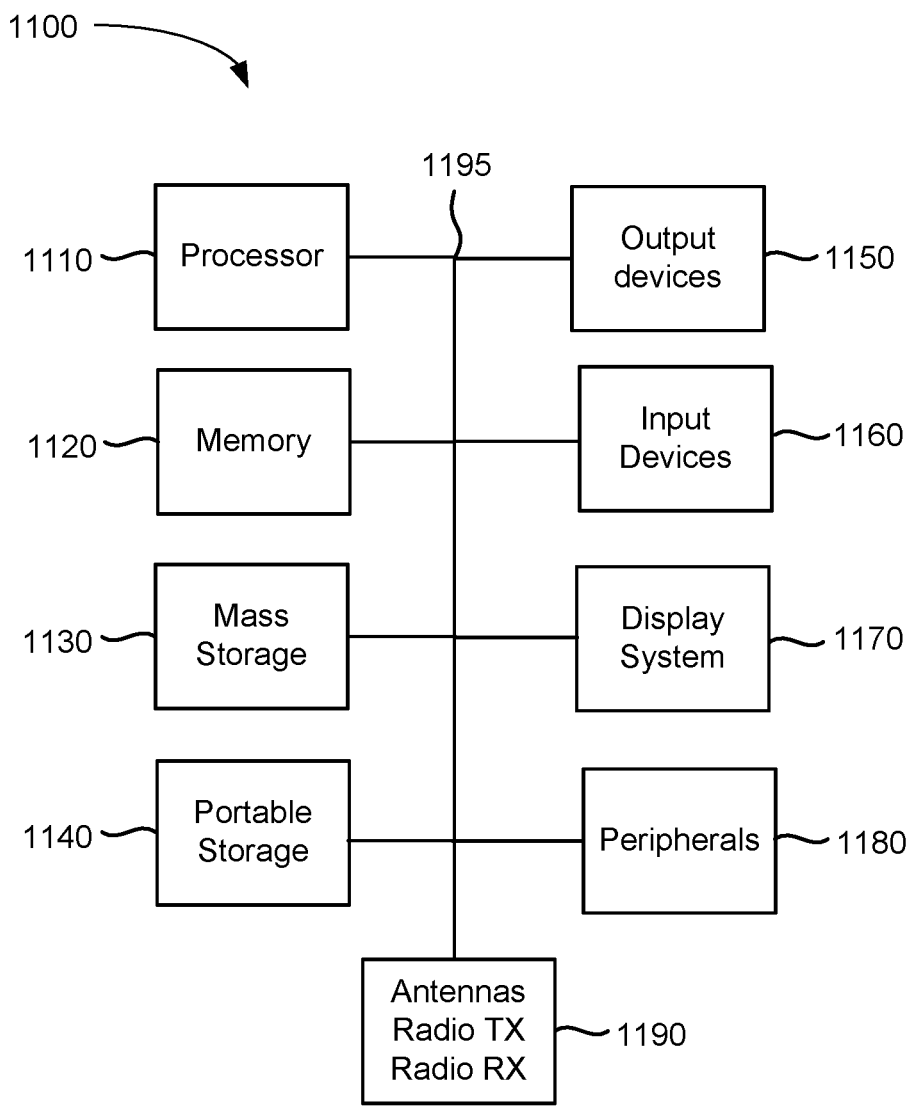
FIG. 11 is a block diagram of a system for implementing the present technology.

FIG. 11 is a block diagram of a computer system 1100 for implementing the present technology. System 1100 of FIG. 11 may be implemented in the contexts of the likes of client 1110, mobile device 1120, computing device 1130, network server 1150, application server 1160, and data stores 1170.

The computing system 1100 of FIG. 11 includes one or more processors 1110 and memory 1120. Main memory 1120 stores, in part, instructions and data for execution by processor 1110. Main memory 1110 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and main memory 1120 may be connected via a local microprocessor bus, and the mass storage device 1130, peripheral device(s) 1180, portable or remote storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 can store the system software for implementing embodiments of the present invention for purposes of loading that software into main memory 1120.

Portable storage device 1140 operates in conjunction with a portable non-volatile storage medium, such as a compact disk, digital video disk, magnetic disk, flash storage, etc. to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, or a pointing device, such as a mouse, a trackball, stylus, or cursor direction keys. Additionally, the system 1100 as shown in FIG. 11 includes output devices 1150. Examples of suitable output devices include speakers, printers, network interfaces, and monitors.

Display system 1170 may include a liquid crystal display (LCD), LED display, touch display, or other suitable display device. Display system 1170 receives textual and graphical information and processes the information for output to the display device. Display system may receive input through a touch display and transmit the received input for storage or further processing.

Peripherals 1180 may include any type of computer support device to add additional functionality to the computer system. For example, peripheral device(s) 1180 may include a modem or a router.

The components contained in the computer system 1100 of FIG. 11 can include a personal computer, hand held computing device, tablet computer, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS or iOS, Android, and other suitable operating systems, including mobile versions.

When implementing a mobile device such as smart phone or tablet computer, or any other computing device that communicates wirelessly, the computer system 1100 of FIG. 11 may include one or more antennas, radios, and other circuitry for communicating via wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for providing a conversational system that detects important out-of-domain content, comprising:
   receiving an utterance having multiple words;
   performing a parsing operation on the utterance by parser code stored in memory and executed by a processor on a computing device;
   determining one or more words of the utterance are not recognized by the parser;
   determining that one or more of the one or more words not recognized by the parser are important by classifier code stored in memory and executed by a processor on the computing device; and
   generating an action based on the words that are parsed by the parser and the important words that are not parsed by the parser.

2. The method of claim 1, further comprising determining that words that are not parsed that are determined to not be important are ignored.

3. The method of claim 1, wherein the action includes an operation performed by an automated administrative assistant.

4. The method of claim 1, wherein the action includes generating a message that an action can't be taken for the important words that are not parsed by the parser.

5. The method of claim 1, further comprising determining a probability that the one or more unparsed words will be linked to a content page available on the Internet.

6. The method of claim 1, further comprising determining that the one or more unparsed words are prominent in the utterance.

7. The method of claim 1, further comprising determining that the one or more unparsed words include a named entity.

8. The method of claim 1, further comprising determining that the one or more unparsed words form a syntactic constituent.

9. The method of claim 1, further comprising determining that the one or more unparsed words meet a threshold associated with importance.

10. The method of claim 1, further comprising determining a first action by the parser, the action based on the words that are parsed by the parser and the important words that are not parsed by the parser forming a second plan of action for the utterance, the second plan of action replacing the first plan of action.

11. The method of claim 10, wherein the first plan of action ignores the words that are not parsed.

12. The method of claim 10, wherein the second plan of action calls for generating a message regarding an inability to handle the words that are not parsed.

13. A system for generating annotated dialogue system training data, comprising:

a processor;

memory;

one or more modules stored in memory and executable by the processor to receive an utterance having multiple words, perform a parsing operation on the utterance by parser code stored in memory and executed by a processor on a computing device, determine one or more words of the utterance are not recognized by the parser, determine that one or more of the one or more words not recognized by the parser are important by classifier code stored in memory and executed by a processor on the computing device, and generate an action based on the words that are parsed by the parser and the important words that are not parsed by the parser.

14. A non-transitory computer readable storage medium having embodied thereon a program, the program being executable by a processor to perform a method for generating annotated dialogue system training data, the method comprising:

receiving an utterance having multiple words;

performing a parsing operation on the utterance by parser code stored in memory and executed by a processor on a computing device;

determining one or more words of the utterance are not recognized by the parser;

determining that one or more of the one or more words not recognized by the parser are important by classifier code stored in memory and executed by a processor on the computing device; and generating an action based on the words that are parsed by the parser and the important words that are not parsed by the parser.

* * * * *